US008950813B2

(12) United States Patent
Nawaz

(10) Patent No.: US 8,950,813 B2
(45) Date of Patent: Feb. 10, 2015

(54) INTEGRATED ADJUSTABLE HEADREST

(71) Applicant: Ali Nawaz, Sunnyside, NY (US)

(72) Inventor: Ali Nawaz, Sunnyside, NY (US)

(*) Notice: Subject to any disclaimer, the term of this patent is extended or adjusted under 35 U.S.C. 154(b) by 211 days.

(21) Appl. No.: 13/739,601

(22) Filed: Jan. 11, 2013

(65) Prior Publication Data
US 2013/0181496 A1   Jul. 18, 2013

Related U.S. Application Data

(60) Provisional application No. 61/585,781, filed on Jan. 12, 2012.

(51) Int. Cl.
A47C 1/10     (2006.01)
A47C 7/36     (2006.01)
A61G 15/00    (2006.01)
B60R 22/28    (2006.01)
B60N 2/48     (2006.01)

(52) U.S. Cl.
CPC ............ B60N 2/4844 (2013.01); B60N 2/4805 (2013.01); B60N 2/4882 (2013.01)
USPC ............................ 297/406; 297/393; 297/398

(58) Field of Classification Search
CPC ... B60N 2/4882; B60N 2/2851; B60N 2/2872
USPC ......... 297/391, 406, 407, 408, 393, 397, 392, 297/216.2, 398, 452.33, 452.34, 396, 487; 5/601, 622, 637
See application file for complete search history.

(56) References Cited

U.S. PATENT DOCUMENTS

| 2,488,155 | A | * | 11/1949 | Ayers et al. | 297/392 |
| 4,130,318 | A | * | 12/1978 | Hemmen et al. | 297/410 |
| 4,205,878 | A | * | 6/1980 | Wooten | 297/391 |
| 5,904,405 | A | * | 5/1999 | Wu | 297/391 |
| 5,967,613 | A | * | 10/1999 | McKeever | 297/397 |
| 6,120,099 | A | * | 9/2000 | Reikerås et al. | 297/391 |
| 6,508,513 | B1 | * | 1/2003 | Hall et al. | 297/411.25 |
| 6,513,871 | B2 | * | 2/2003 | Bartels | 297/216.12 |
| 6,601,804 | B2 | * | 8/2003 | Bisch | 248/118 |
| 6,666,517 | B2 | * | 12/2003 | Clough | 297/410 |
| 6,692,071 | B2 | * | 2/2004 | Fowler | 297/216.12 |
| 6,877,809 | B2 | * | 4/2005 | Tanaka et al. | 297/253 |
| 6,893,094 | B2 | * | 5/2005 | O'Connor | 297/397 |
| 6,910,741 | B2 | * | 6/2005 | Footitt | 297/452.29 |

(Continued)

FOREIGN PATENT DOCUMENTS

| DE | 102007039063 A1 | * | 2/2009 | B60N 2/48 |
| FR | 2929185 A1 | * | 10/2009 | B60N 2/48 |
| FR | 2929186 A1 | * | 10/2009 | B60N 2/48 |

Primary Examiner — Darnell Jayne
Assistant Examiner — Kimberley S Wright

(57) ABSTRACT

An integrated adjustable headrest includes a first curved head support and a second curved head support. Each of the curved head supports is secured to an adjustable rail, which itself is connected to the vertical track of a respective interior compartment. The interior compartment is located near the top of a chair, near a headrest section, inside a cavity. The curved head support can slide in and out of the adjustable rail slot. When extended, a person can rest their head on the curved head support. The curved head supports are also tiltable and extendable by manipulating the interior compartments or the adjustable rails. Locking mechanisms allow a user to adjust both the extension of the curved head supports and the angle of the adjustable rail slots. Once adjusted, the locking mechanisms secure the curved head supports in a desired position.

19 Claims, 6 Drawing Sheets

(56) References Cited

U.S. PATENT DOCUMENTS

| | | |
|---|---|---|
| 7,144,083 B2 * | 12/2006 | List et al. .................. 297/391 |
| 7,201,448 B2 * | 4/2007 | Williamson et al. ........... 297/407 |
| 7,237,842 B2 * | 7/2007 | Schmuda von Trzebiatowski et al. .................. 297/391 |
| 7,264,313 B2 * | 9/2007 | Clough .................. 297/407 |
| 7,293,828 B2 * | 11/2007 | Yoshida .................. 297/216.11 |
| 7,364,239 B2 * | 4/2008 | Clough .................. 297/391 |
| 7,631,935 B2 * | 12/2009 | Chen et al. .................. 297/284.9 |
| 8,295,535 B2 * | 10/2012 | Tracy .................. 381/389 |
| 8,733,830 B2 * | 5/2014 | Sanchez .................. 297/188.03 |
| 2001/0040401 A1 * | 11/2001 | Lin .................. 297/397 |
| 2012/0292973 A1 * | 11/2012 | Westerink et al. ........... 297/391 |

* cited by examiner

US 8,950,813 B2

INTEGRATED ADJUSTABLE HEADREST

The current application claims a priority to the U.S. Provisional Patent application Ser. No. 61/585,781 filed on Jan. 12, 2012.

FIELD OF THE INVENTION

The present invention relates generally to a user adjustable headrest built into a seat.

BACKGROUND OF THE INVENTION

In modern times numerous people travel, for either personal or business reasons. People often take long flights, train rides, or car trips in order to visit family, go on vacation, or attend business meetings. While the modern person can travel further and with much more ease than the people of yesteryear, travelling can still prove arduous and uncomfortable. Much of this is because seats do not allow for much personal adjustment, especially in cramped seating arrangements, such as those found on airplanes. The ability to sleep, or even simply rest one's head, is highly desirable but not easily attainable. Since sitting for long durations is not natural to humans, it is difficult to find a comfortable resting position. Often times a person will naturally lean to one side, but in cramped conditions this is hampered by adjacent passengers. There exists a need for a comfortable support for sitting persons.

Currently this need is addressed by separate inventions which are meant to be used in conjunction with a seat. Common examples include basic and shaped pillows. These current solutions intend to provide a soft and comfortable surface for a person to lean and rest against. Some are even contoured to fit between a person's torso or neck and a seat. While these solutions are better than nothing, drawbacks do exist. The most glaring issue is the difficulty in keeping such products in position. Since the products are not integrated to the seat, they are not locked in a position. As a result, they may be unintentionally moved as a person adjusts themselves to a more comfortable position, or even shifts during sleep. Many times this results in an struggle to get the pillow in a comfortable position that is also stable. These issues remain to be addressed.

It is therefore an object of the present invention to provide a headrest which is integrated into a seat, providing a secure base for the headrest. It is a further object of the present invention to provide a headrest that can be adjusted and locked to a desired position by a user, increasing user comfort.

DETAIL DESCRIPTIONS OF THE INVENTION

Figure 1:
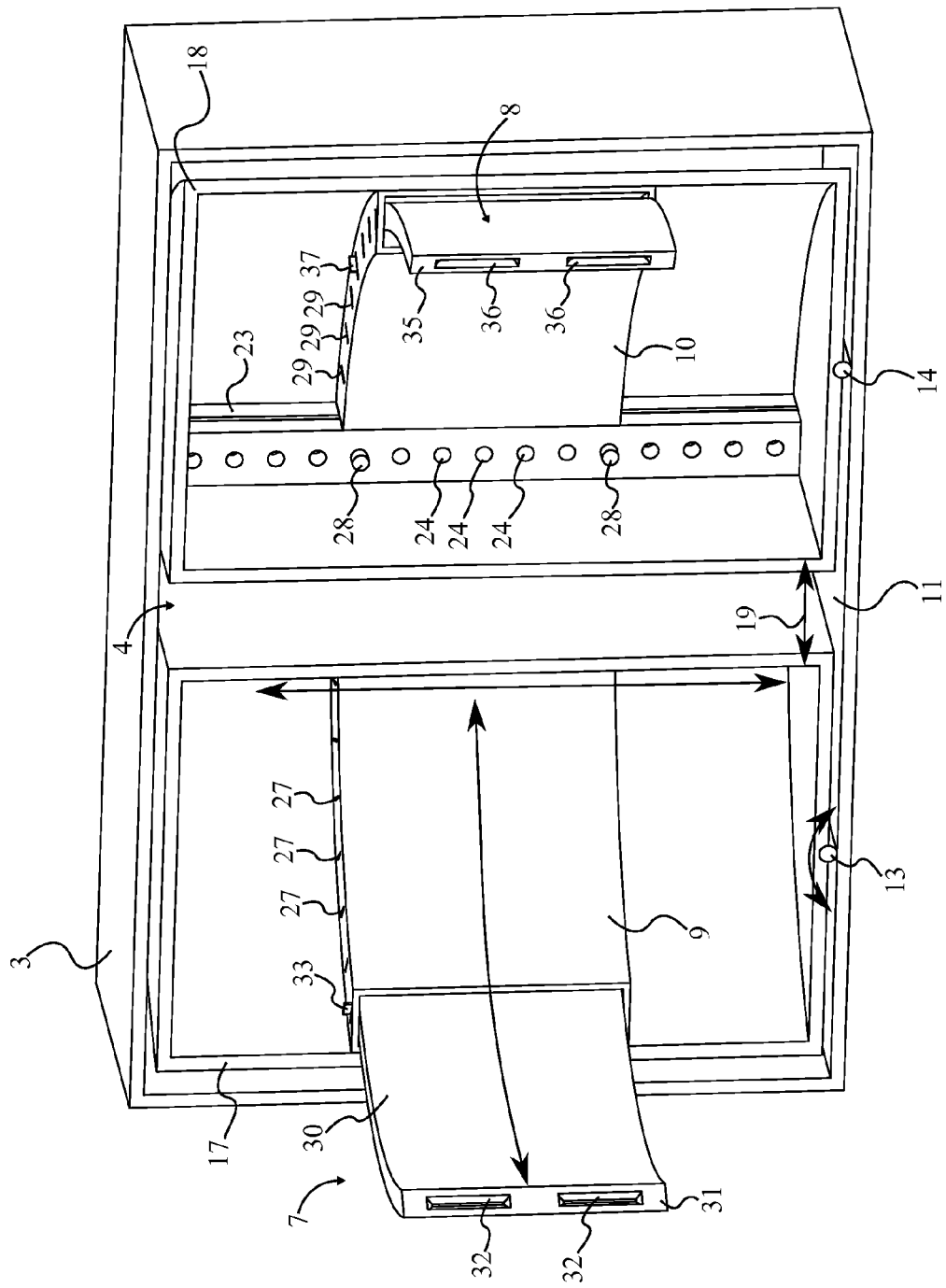
FIG. 1 is a front perspective of the present invention, showing a fully extended first curved head rest, partially extended second curved head rest, and tilted second compartment; showing the range of tilting; showing the range of extension; and showing the range of height adjustment.

All illustrations of the drawings are for the purpose of describing selected versions of the present invention and are not intended to limit the scope of the present invention.

The present invention is an integrated adjustable headrest for a seat. The present invention comprises a chair 1 which itself comprises a headrest section 2. The head rest section comprises a structural member 3, an interior cavity 4, a first rail opening 5, and a second rail opening 6. The headrest section 2 is positioned along the top of a supporting face of the chair 1. Positioned opposite each other on the headrest section 2 are a first curved head support 7 and a second curved head support 8. The first curved head support 7 and second curved head support 8 slide into a first adjustable rail 9 and a second adjustable rail 10, respectively, and can be extended to provide a comfortable support for a person to rest their head against. The rail openings are positioned on the headrest section 2 of the chair 1 and provide a hole through which a user can access and manipulate the first curved head support 7 and second curved head support 8.

The headrest section 2 houses many of the components of the present invention. The structural member 3 and the cavity are positioned adjacent to each other, with the structural member 3 serving as a mounting point for the components of the present invention, while the interior cavity 4 provides space for said components. The structural member 3 comprises a base 11, a back wall 12, a first hinge 13, a second hinge 14, a first set of tilt latch receptacles 15, and a second set of tilt latch receptacles 16. The back wall 12 is connected to the rear end of the base 11 and is perpendicular to the base 11. On the back wall 12 is the first set of tilt latch receptacles 15 and the second set of tilt latch receptacles 16. The first set of tilt latch receptacles 15 and second set of tilt latch receptacles 16 mirror each other across the back wall 12 and each set forms a curved pattern which will allow tilting of the present invention, as discussed later. The first hinge 13 and the second hinge 14 are connected to the base 11 and are oriented such that their axis of rotation traverses into the back wall 12. The first hinge 13 and the second hinge 14 serve as connection points for a first compartment 17 and a second compartment 18, respectively, and allow said compartments to tilt. The first hinge 13 and the second hinge 14 are separated from each other by a clearance distance 19, which allows the first compartment 17 and the second compartment 18 to be adjusted without interfering with each other.

Figure 2:
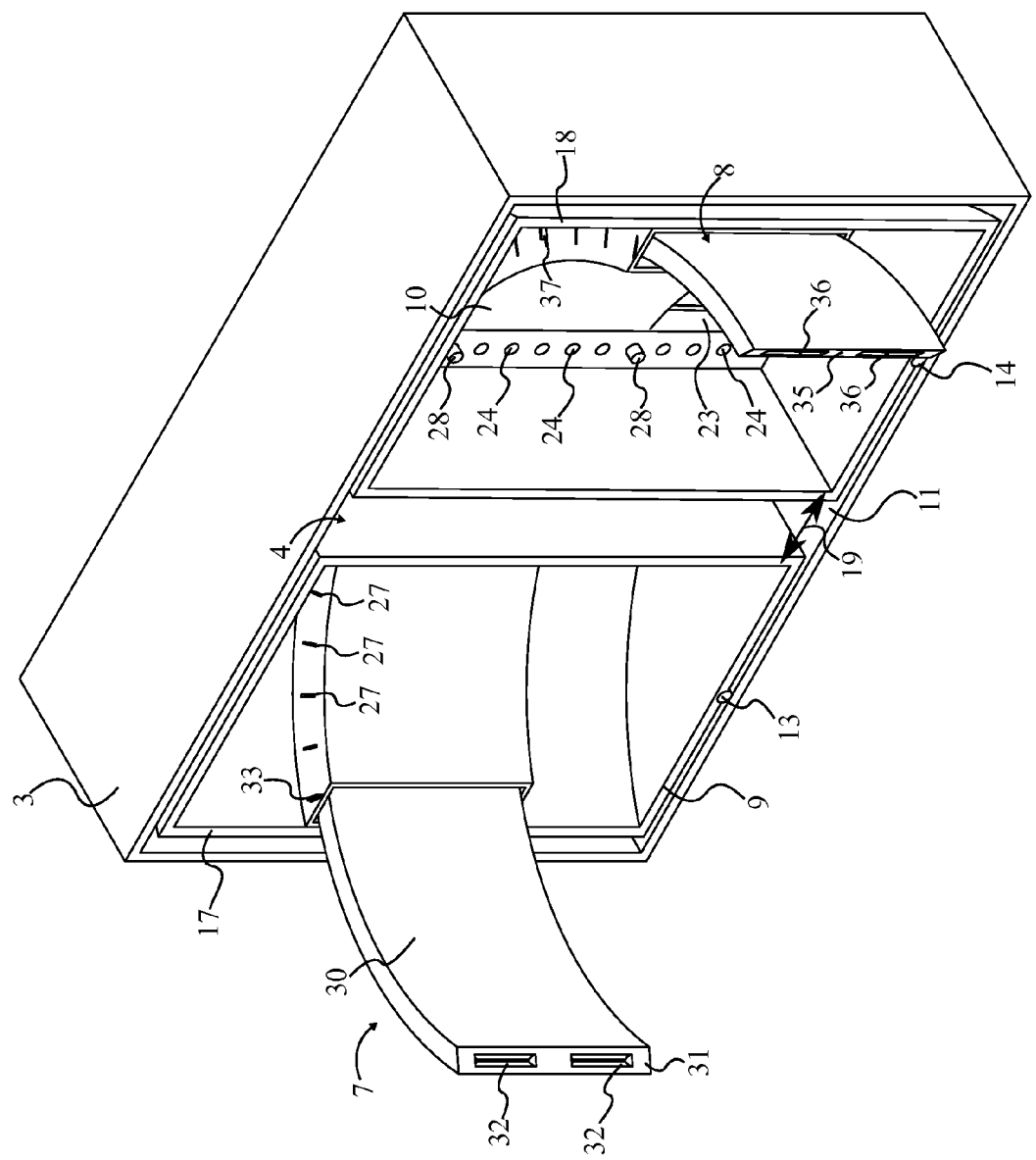
FIG. 2 is another front perspective view of the present invention, showing a fully extended first curved head rest, partially extended second curved head rest, and tilted second compartment.
Figure 3:
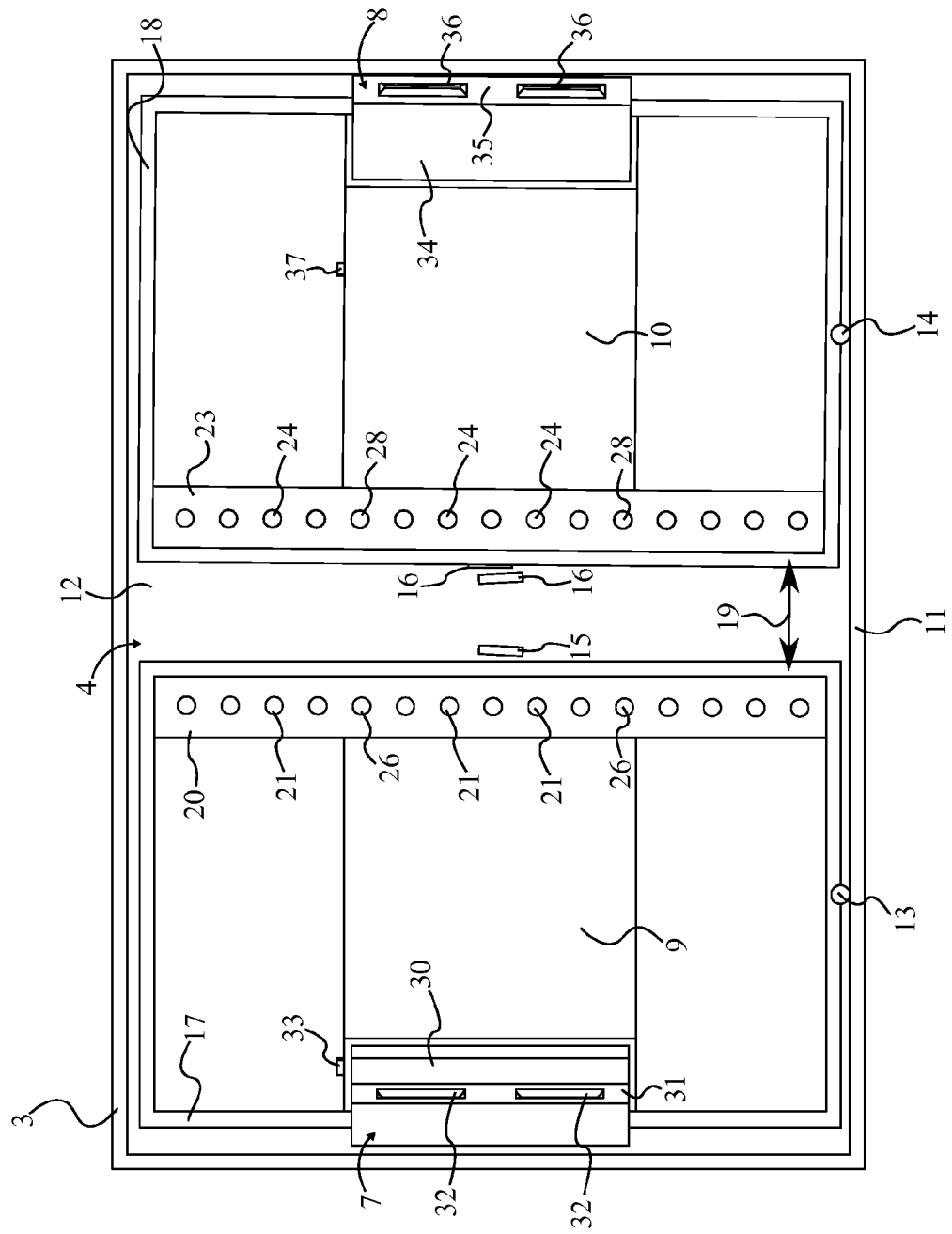
FIG. 3 is a front view of the present invention, showing a fully extended first curved head rest, partially extended second curved head rest, and tilted second compartment.
Figure 4:
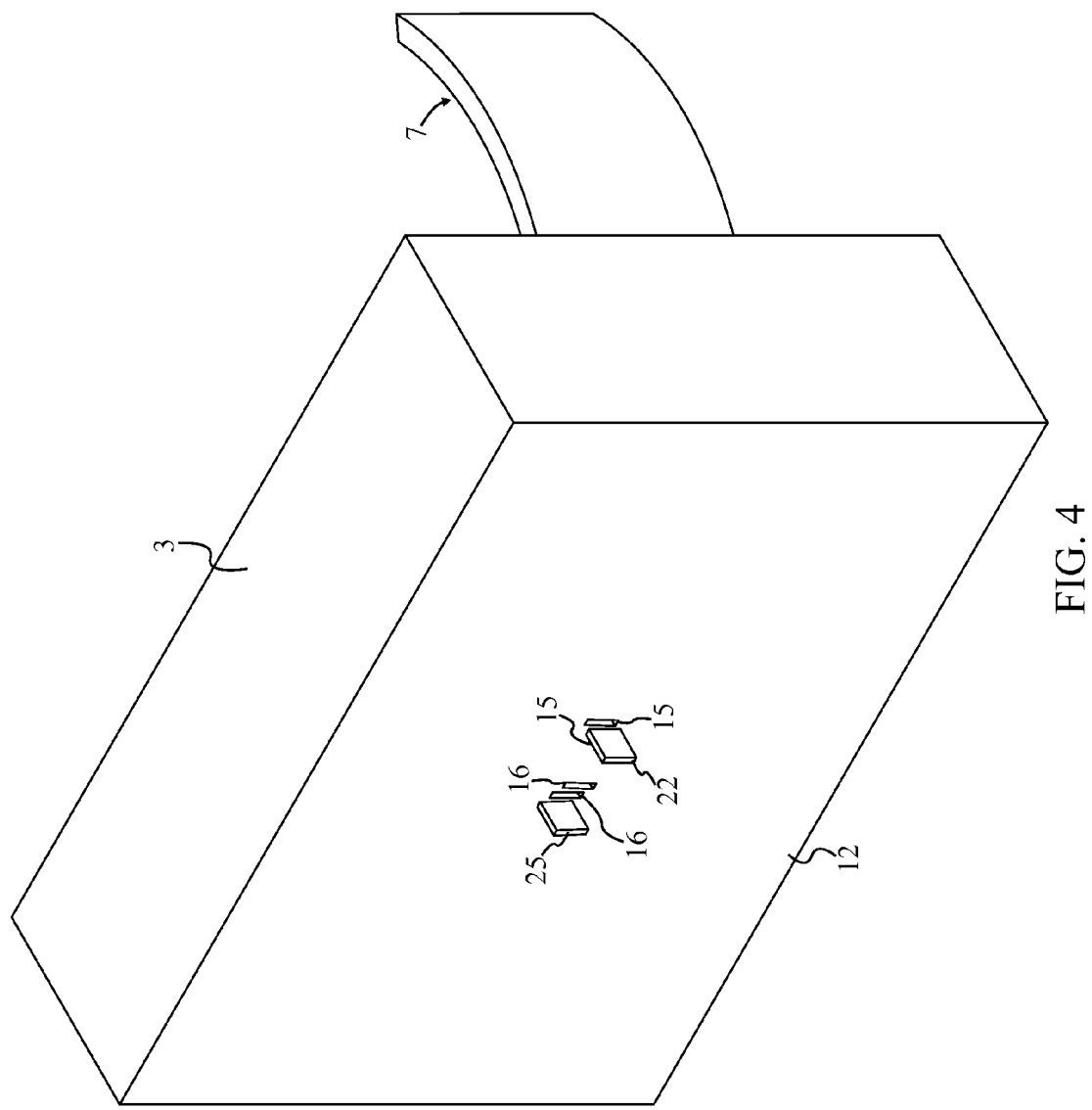
FIG. 4 is a rear perspective view of the present invention, showing a fully extended first curved head rest and a tilted second compartment.
Figure 5:
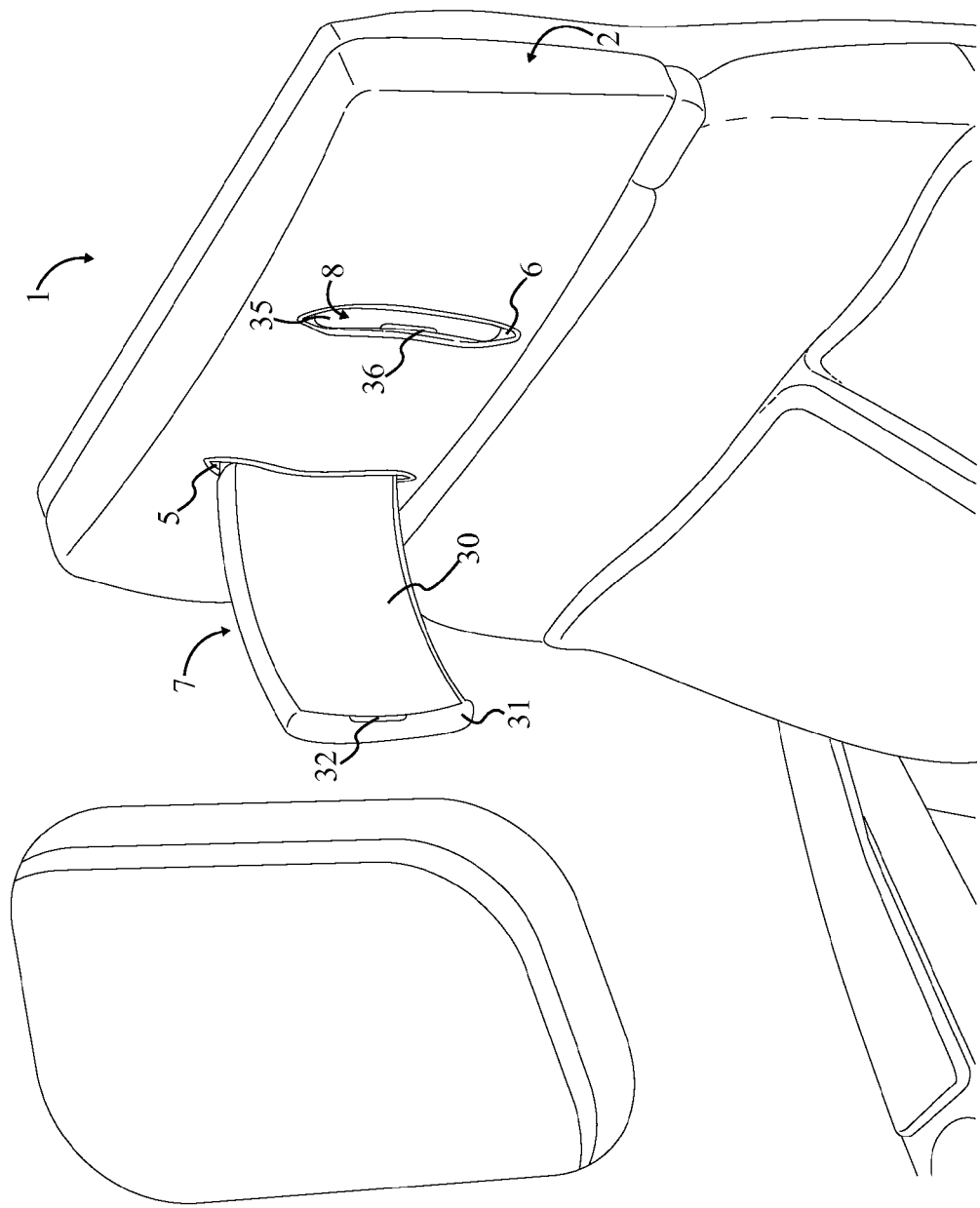
FIG. 5 is a perspective view of the present invention as part of an airplane seat, with the first curved head support fully extended, the second curved head support fully retracted, and an alternate design for the first handle and the second handle.
Figure 6:
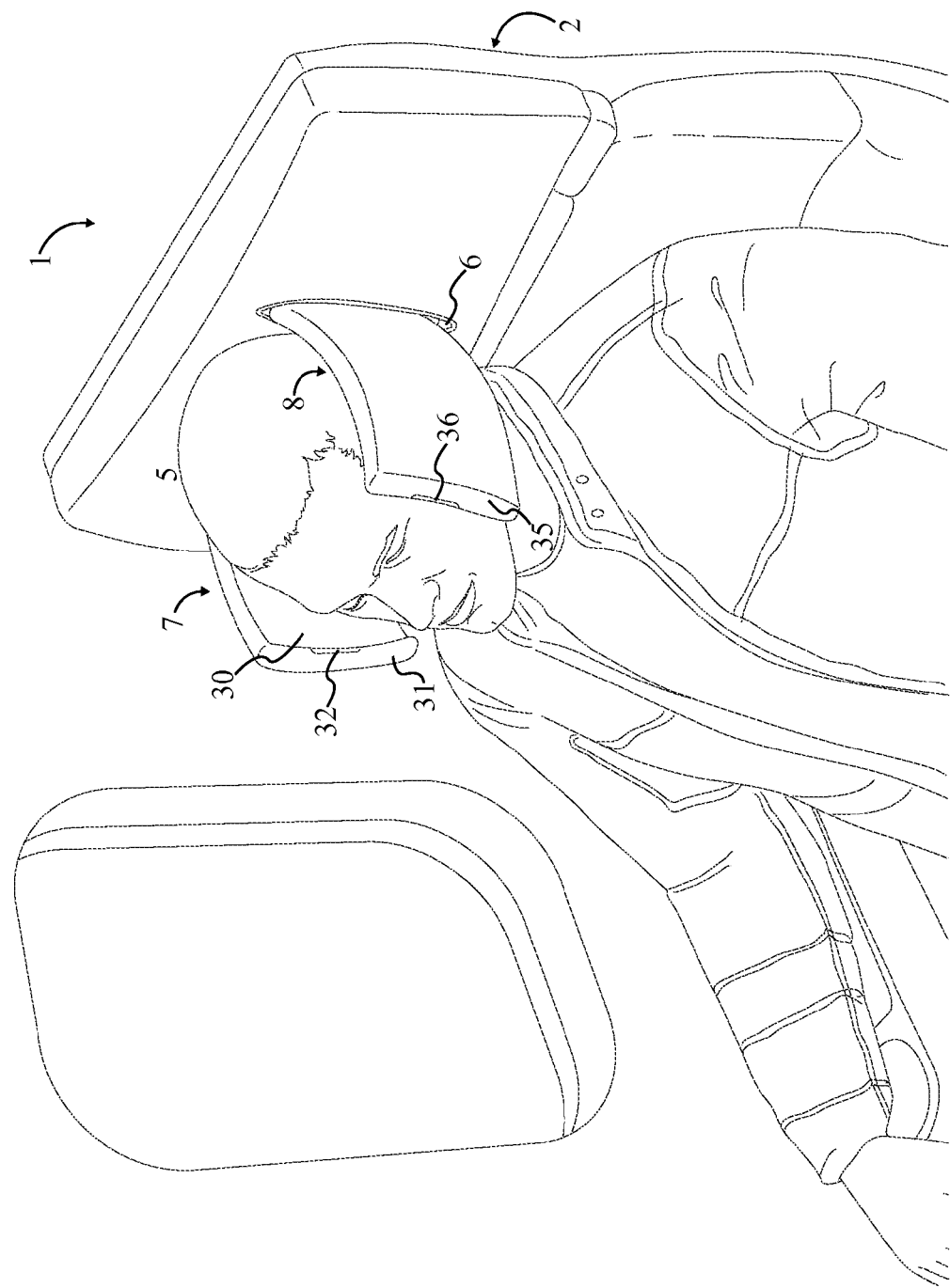
FIG. 6 is a perspective view of a person using the present invention as part of an airplane seat, with both the first curved head supports and second curved head support fully extended and an alternate design for the first handle and the second handle.

Seen in FIG. 1-FIG. 3, the first compartment 17 and the second compartment 18 of the present invention provide tilting capability, as well as provide a system that receives and interacts with the first adjustable rail 9 and second adjustable rail 10, which themselves house the first curved head support 7 and the second curved head support 8. As discussed earlier, the first compartment 17 is connected to the first hinge 13 of the headrest section 2. The first compartment 17 comprises a first vertical track 20, a first set of auxiliary latch receptacles 21, and a first tilt latch 22. The first vertical track 20 serves as a mounting system for the first adjustable rail 9, allowing the first adjustable rail 9 to slide up and down. To secure the first adjustable rail 9 in a desired position, the first set of auxiliary latch receptacles 21 are positioned along the first vertical track 20. This first set of auxiliary latch receptacles 21 engages with the corresponding component of the first adjustable rail 9 to lock the first adjustable rail 9 and prevent unwanted movement. The first tilt latch 22 is positioned on the outside face of the first vertical track 20, on the opposite side of where the first set of auxiliary latch receptacles 21 is positioned. The first tilt latch 22 is designed to engage with the first set of tilt latch receptacles 15. This allows a user to tilt the first compartment 17 and lock it in a desired position by engaging the first tilt latch 22 with the first set of tilt latch receptacles 15.

Mirroring the first compartment 17, the second compartment 18 comprises a second vertical track 23, a second set of auxiliary latch receptacles 24, and a second tilt latch 25. The second vertical track 23 receives the second adjustable rail 10 and allows said second adjustable rail 10 to slide along the vertical track. The second set of auxiliary latch receptacles 24 are positioned along the second vertical track 23, interior to the second compartment 18, and engage with the necessary latch from the second adjustable rail 10 to lock the second adjustable rail 10 at a desired height. The second tilt latch 25 is positioned on the rear exterior face of the second vertical track 23, opposite the second set of auxiliary tilt latches. The second tilt latch 25 engages with the second set of tilt latch receptacles 16, allowing the second compartment 18 to be locked in a desired tilted position.

Illustrated in FIG. 1-FIG. 3, the first adjustable rail 9 and the second adjustable rail 10 are housed inside the first compartment 17 and second compartment 18, respectively. The first adjustable rail 9 comprises a first auxiliary latch 26 and a first set of latch receptacles 27. The first set of latch receptacles 27 are positioned along the first adjustable rail 9 on the top face. While the first set of latch receptacles 27 could be positioned on one of the side faces, this would require the corresponding latch on the first curved head support 7 to be on the side; since the side of the first curved head support 7 is where a user rests their head, this positioning of the first set of latch receptacles 27 would result in a less functional and less aesthetically pleasing first curved head support 7. The first auxiliary latch 26 is positioned on the interior end of the first adjustable rail 9 and engages with the first set of auxiliary latch receptacles 21 on the first vertical track 20. The first auxiliary latch 26 allows a user to lock the first adjustable rail 9 at the desired height.

The second adjustable rail 10 comprises a second auxiliary latch 28 and second set of latch receptacles 29. These components function identically to the first auxiliary latch 26 and first set of latch receptacles 27. The second set of latch receptacles 29 are positioned along the top face of the second adjustable rail 10 and engage with the related latch on the second curved head support 8. Positioned on the interior end of the second adjustable rail 10 is the second auxiliary latch 28, which engages with the second set of auxiliary latch receptacles 24. The second auxiliary latch 28 allows the second adjustable rail 10 to be moved along the second vertical track 23 and locked at a desired height.

Visible in FIG. 1-FIG. 4 and FIG. 5-FIG. 6, the first curved head support 7 comprises a first cushioned face 30 and a first exterior end 31. The first exterior end 31 comprises a first handle 32. The first cushioned face 30 provides a soft surface upon which a person can rest their head. In the interests of user comfort, the first cushion face is convex to better support a person's resting head. The first exterior end 31 is flush with the seat in a storage configuration, and extended from the seat in a use configuration. Located on the first exterior end 31 is the first handle 32, which allows a user to grab the first curved head support 7 and change it between a storage configuration and a use configuration. Located on the first curved head support 7, opposite the first exterior end 31, is a first interior latch 33. The first interior latch 33 is designed to engage with a first set of latch receptacles 27, and is intended to allow a user to adjust length of the first curved head support 7.

Also depicted in FIG. 1-FIG. 4 and FIG. 5-FIG. 6 the second curved head support 8 mirrors the first curved head support 7, and as a result has many parallel components. The second curved head support 8 comprises a second cushioned face 34 and a second exterior end 35. The second exterior end 35 comprises a second handle 36, which enables a user to grasp and interact with the second curved head support 8. More specifically, the second handle 36 allows a user to extend and retract the second curved head support 8, switching between a fully extended use configuration and a fully retracted storage configuration. The adjustable nature of the second curved head support 8 also allows it to be used in a number of positioned between the fully extended use configuration and fully retracted storage configuration. The second cushioned face 34, just like the first cushioned face 30, provides a soft and comfortable surface designed to support a person's head. The second cushioned face 34 is concave, which provides a more comfortable resting surface than would a flat or convex face. A second interior latch 37, akin to the first interior latch 33, is positioned on the interior end of the second curved head support 8. The second interior latch 37 engages with the second set of latch receptacles 29. As with the first interior latch 33, the second interior latch 37 and the second set of latch receptacles 29 are designed to allow a user to adjust the length of the second curved head support 8.

The first adjustable rail 9 and second adjustable rail 10 are accessed through the first rail opening 5 and second rail opening 6, respectively. The first adjustable rail 9 and the second adjustable rail 10 are designed to receive the first curved head support 7 and second curved head support 8; by sliding the head supports into or out of the adjustable rail, a user adjusts the length of the curved head supports. The different positions of the first curved head support 7 and second curved head support 8 can be seen in FIG. 1-FIG. 3 and FIG. 5. To adjust the length of either curved head support, a user simply disengages the interior latch from one of the latch receptacles, then moves the curved head support into or out of the adjustable rail. Once the curved head support has been changed to a desired length, the interior latch is reengaged with an individual latch receptacle matching the current position of the curved head support.

Similar to how the extension of the curved head supports can be adjusted by disengaging and reengaging the necessary components, the tilt and height of said curved head supports can be adjusted by disengaging and reengaging separate latches and latch receptacles. To adjust the tilt, a person must disengage the tilt latch from the corresponding set of tilt latch receptacles. Once the desired tilt has been achieved, the tilt latch is reengaged with the paired set of tilt latch receptacles, locking the tilt at the desired angle. The same procedure is followed to adjust the height; the auxiliary latch is disengaged from the set of auxiliary latch receptacles, which allows a user to adjust the height in the up or down directions. Upon finding the desired height, a user simply reengages the auxiliary latch with the matching set of auxiliary latch receptacles. This provides the key functionality of allowing adjustable tilt, height, and extension.

The combination of the first compartment 17, second compartment 18, first adjustable rail 9, second adjustable rail 10, first curved head support 7, and second curved head support 8 allow a user to adjust the tilt, height, and extension of the curved head supports to achieve the maximum comfort. FIG. 1-FIG. 3 depict the differences in tilt and extension between the first curved head support 7 and second curved head support 8; the first curved head support 7 is fully extended and level while the second curved head support 8 is partially extended and tilted. The difference in extension is also easily visible in FIG. 5. In the preferred embodiment the capabilities of tilt, height, and extension adjustment are provided by a system of rails, tracks, and hinges, but in other embodiments a different combination of rails, tracks, and hinges could be provided to allow for said adjustments. For example, instead of providing a tilt function by means of the first compartment 17 and the second compartment 18, the curved head supports could be directly attached to a hinge along the adjustable rails. Potentially, the adjustable rails could be connected to the compartments by a ball joint, rather than engaging with a track, providing both tilt capability and some vertical adjustment. Other connection types can be explored as long as they provide the capability to adjust the tilt, height, and extension of the present invention.

While the present invention is described with multiple locking systems, the type of locking system implemented can vary. For example, a common locking mechanism involves a spring-loaded latch that traverses into a matching receptacle (such as a notch). By providing a control, such as a button or lever, the spring-loaded latch can be retracted from the notch, at which point it can be realigned with a different notch. In this manner, the locking mechanism can be used to adjust the positioning of the different components of the present invention. Other locking mechanisms are also possible; for example, a system of magnetic connections can be placed with the chair 1 and along the curved head supports. These could be activated or deactivated by running a current. Running the current would activate the magnetic connection and lock the components in place. By deactivating the current, the connection would be broken and the components could be adjusted to a desired position. At this point, the current can be reactivated, locking the components in the new position. In general, a number of locking mechanisms can be implemented as long as they provide for a means of rotating and adjusting the length of the first curved head support 7 and second curved head support 8.

The function of the invention is applicable in a wide variety of environments. That is, the core function of provide an integrated adjustable headrest is useful in large number of scenarios. Common applications of the present invention include its use in airplane seats, car seats, and train seats. These are common environments where a person may be confined for a long period of time; the present invention provides a mean for such persons to rest their heads and sleep easier, eliminating the bulk and difficulty of using pillows and cushions. However, the present invention is not limited to the above scenarios. In military ships bedding is often at a premium, with "hot bunking", in which multiple sailors share the bed. In such cases, having seats with built in headrests is even more beneficial, providing more opportunities for weary sailors to catch some quick sleep when the time presents itself, even if their bunk is currently occupied by another sailor. Additional potential uses for the present invention include common household seats, office seats, and other public seating areas.

Although the invention has been explained in relation to its preferred embodiment, it is to be understood that many other possible modifications and variations can be made without departing from the spirit and scope of the invention as hereinafter claimed.

What is claimed is:

1. An integrated adjustable headrest comprises,
   a structural member;
   an interior cavity;
   a first rail opening;
   a second rail opening;
   a first compartment;
   a second compartment;
   the first compartment comprises a first vertical track;
   the second compartment comprises a second vertical track;
   a first curved head support;
   a second curved head support;
   a first adjustable rail;
   a second adjustable rail;
   the structural member being positioned adjacent to the interior cavity;
   the first curved head support being slidably engaged with the first adjustable rail;
   the second curved head support being slidably engaged with the second adjustable rail;
   the first adjustable rail being slidably engaged with the first vertical track;
   the second adjustable rail being slidably engaged with the second vertical track;
   the first compartment and the second compartment being positioned within the interior cavity;
   the first compartment being tiltably connected to the structural member;
   the second compartment being tiltably connected to the structural member; and
   the second rail opening being positioned coincident to and opposite the first rail opening across the headrest.

2. The integrated adjustable headrest as claimed in claim 1 comprises,
   the first compartment further comprises a first set of auxiliary latch receptacles and a first tilt latch;
   the first curved head support comprises a first cushioned face, a first exterior end, a first interior latch, and a first handle;
   the first adjustable rail comprises a first set of latch receptacles and a first auxiliary latch;
   the first set of auxiliary latch receptacles being positioned along the first vertical track;
   the first tilt latch being positioned on the first vertical track opposite the first set of auxiliary latch receptacles;
   the first interior latch being positioned opposite the first exterior end along the first curved head support;
   the first set of latch receptacles being positioned along the first adjustable rail support; and
   the first curved head support traversing through the first rail opening into the first adjustable rail.

3. The integrated adjustable headrest as claimed in claim 2 comprises,
   the first handle being positioned on the first exterior end; and
   the first cushioned face being concave.

4. The integrated adjustable headrest as claimed in claim 2 comprises,
   the first interior latch being engaged with the first set of latch receptacles; and
   the first auxiliary latch being engaged with the first set of auxiliary latch receptacles.

5. The integrated adjustable headrest as claimed in claim 2 comprises, the second compartment further comprises a second set of auxiliary latch receptacles and a second tilt latch;
the second curved head support comprises a second cushioned face, a second exterior end, a second interior latch, and a second handle;
the second adjustable rail comprises a second set of latch receptacles and a second auxiliary latch;
the second set of auxiliary latch receptacles being positioned along the second vertical track;
the second tilt latch being positioned on the second vertical track opposite the second set of auxiliary latch receptacles;
the second interior latch being positioned opposite the second exterior end along the second curved head support;
the second set of latch receptacles being positioned along the second adjustable rail support; and
the second curved head support traversing through the second rail opening into the second adjustable rail.

6. The integrated adjustable headrest as claimed in claim 5 comprises,
the second handle being positioned on the second exterior end; and
the second cushioned face being concave.

7. The integrated adjustable headrest as claimed in claim 5 comprises,
the second interior latch being engaged with the second set of latch receptacles; and
the second auxiliary latch being engaged with the second set of auxiliary latch receptacles.

8. The integrated adjustable headrest as claimed in claim 2 comprises,
the structural member comprises a base, a back wall, a first hinge, a second hinge, a first set of tilt latch receptacles, and a second set of tilt latch receptacles;
the base being perpendicularly connected to the back wall;
the first hinge and the second hinge each being connected to the base;
the first hinge and the second hinge being separated by a clearance distance across the base;
the first set of tilt latch receptacles and the second set of tilt latch receptacles being positioned on the back wall; and
the first set of tilt latch receptacles being positioned adjacent to the second set of tilt latch receptacles.

9. The integrated adjustable headrest as claimed in claim 8 comprises,
the first compartment being rotatably connected to the first hinge;
the second compartment being rotatably connected to the second hinge;
the first tilt latch being engaged with the first set of tilt latch receptacles; and
the second tilt latch being engaged with the second set of tilt latch receptacles.

10. An integrated adjustable headrest comprises,
a structural member;
an interior cavity;
a first rail opening;
a second rail opening;
the structural member comprises a base, a back wall, a first hinge, a second hinge, a first set of tilt latch receptacles, and a second set of tilt latch receptacles;
a first compartment;
a second compartment;
the first compartment comprises a first vertical track, a first set of auxiliary latch receptacles and a first tilt latch;
the second compartment comprises a second vertical track, a second set of auxiliary latch receptacles and a second tilt latch;
a first curved head support;
a second curved head support;
the first curved head support comprises a first interior latch;
the second curved head support comprises a second interior latch;
a first adjustable rail;
a second adjustable rail;
the first adjustable rail comprises a first set of latch receptacles and a first auxiliary latch;
the second adjustable rail comprises a second set of latch receptacles and a second auxiliary latch;
the structural member being positioned adjacent to the interior cavity;
the first curved head support being slidably engaged with the first adjustable rail;
the second curved head support being slidably engaged with the second adjustable rail;
the first adjustable rail being slidably engaged with the first vertical track;
the second adjustable rail being slidably engaged with the second vertical track;
the first compartment and the second compartment being positioned within the interior cavity;
the first compartment being tiltably connected to the structural member;
the second compartment being tiltably connected to the structural member; and
the second rail opening being positioned coincident to and opposite the first rail opening across the headrest.

11. The integrated adjustable headrest as claimed in claim 10 comprises,
the first curved head support comprises a first cushioned face, a first exterior end, and a first handle;
the first set of auxiliary latch receptacles being positioned along the first vertical track;
the first tilt latch being positioned on the first vertical track opposite the first set of auxiliary latch receptacles;
the first interior latch being positioned opposite the first exterior end along the first curved head support;
the first set of latch receptacles being positioned along the first adjustable rail support;
the first curved head support traversing through the first rail opening into the first adjustable rail;
the first interior latch being engaged with the first set of latch receptacles; and
the first auxiliary latch being engaged with the first set of auxiliary latch receptacles.

12. The integrated adjustable headrest as claimed in claim 11 comprises,
the first handle being positioned on the first exterior end; and
the first cushioned face being concave.

13. The integrated adjustable headrest as claimed in claim 10 comprises,
the second curved head support comprises a second cushioned face, a second exterior end, and a second handle;
the second set of auxiliary latch receptacles being positioned along the second vertical track;
the second tilt latch being positioned on the second vertical track opposite the second set of auxiliary latch receptacles;
the second interior latch being positioned opposite the second exterior end along the second curved head support;

the second set of latch receptacles being positioned along the second adjustable rail support;
the second curved head support traversing through the second rail opening into the second adjustable rail;
the second interior latch being engaged with the second set of latch receptacles; and
the second auxiliary latch being engaged with the second set of auxiliary latch receptacles.

14. The integrated adjustable headrest as claimed in claim 13 comprises,
the second handle being positioned on the second exterior end; and
the second cushioned face being concave.

15. The integrated adjustable headrest as claimed in claim 10 comprises,
the base being perpendicularly connected to the back wall;
the first hinge and the second hinge each being connected to the base;
the first hinge and the second hinge being separated by a clearance distance across the base;
the first set of tilt latch receptacles and the second set of tilt latch receptacles being positioned on the back wall;
the first set of tilt latch receptacles being positioned adjacent to the second set of tilt latch receptacles;
the first compartment being rotatably connected to the first hinge;
the second compartment being rotatably connected to the second hinge;
the first tilt latch being engaged with the first set of tilt latch receptacles; and
the second tilt latch being engaged with the second set of tilt latch receptacles.

16. An integrated adjustable headrest comprises,
a structural member;
an interior cavity;
a first rail opening;
a second rail opening;
the structural member comprises a base, a back wall, a first hinge, a second hinge, a first set of tilt latch receptacles, and a second set of tilt latch receptacles;
a first compartment;
a second compartment;
the first compartment comprises a first vertical track, a first set of auxiliary latch receptacles and a first tilt latch;
the second compartment comprises a second vertical track, a second set of auxiliary latch receptacles and a second tilt latch;
a first curved head support;
a second curved head support;
the first curved head support comprises a first interior latch;
the second curved head support comprises a second interior latch;
a first adjustable rail;
a second adjustable rail;
the first adjustable rail comprises a first set of latch receptacles and a first auxiliary latch;
the second adjustable rail comprises a second set of latch receptacles and a second auxiliary latch;
the structural member being positioned adjacent to the interior cavity;
the first curved head support being slidably engaged with the first adjustable rail;
the second curved head support being slidably engaged with the second adjustable rail;
the first adjustable rail being slidably engaged with the first vertical track;
the second adjustable rail being slidably engaged with the second vertical track;
the first compartment and the second compartment being positioned within the interior cavity;
the first compartment being tiltably connected to the structural member;
the second compartment being tiltably connected to the structural member;
the second rail opening being positioned coincident to and opposite the first rail opening across the headrest;
the first interior latch being engaged with the first set of latch receptacles;
the first auxiliary latch being engaged with the first set of auxiliary latch receptacles;
the second interior latch being engaged with the second set of latch receptacles;
the second auxiliary latch being engaged with the second set of auxiliary latch receptacles;
the first hinge and the second hinge each being connected to the base;
the first hinge and the second hinge being separated by a clearance distance across the base;
the first tilt latch being engaged with the first set of tilt latch receptacles; and
the second tilt latch being engaged with the second set of tilt latch receptacles.

17. The integrated adjustable headrest as claimed in claim 16 comprises,
the first curved head support comprises a first cushioned face, a first exterior end, and a first handle;
the first set of auxiliary latch receptacles being positioned along the first vertical track;
the first tilt latch being positioned on the first vertical track opposite the first set of auxiliary latch receptacles;
the first interior latch being positioned opposite the first exterior end along the first curved head support;
the first set of latch receptacles being positioned along the first adjustable rail support;
the first curved head support traversing through the first rail opening into the first adjustable rail;
the first handle being positioned on the first exterior end; and
the first cushioned face being concave.

18. The integrated adjustable headrest as claimed in claim 16 comprises,
the second curved head support comprises a second cushioned face, a second exterior end, and a second handle;
the second set of auxiliary latch receptacles being positioned along the second vertical track;
the second tilt latch being positioned on the second vertical track opposite the second set of auxiliary latch receptacles;
the second interior latch being positioned opposite the second exterior end along the second curved head support;
the second set of latch receptacles being positioned along the second adjustable rail support;
the second curved head support traversing through the second rail opening into the second adjustable rail;
the second handle being positioned on the second exterior end; and
the second cushioned face being concave.

19. The integrated adjustable headrest as claimed in claim 16 comprises,
the base being perpendicularly connected to the back wall;
the first set of tilt latch receptacles and the second set of tilt latch receptacles being positioned on the back wall;

the first set of tilt latch receptacles being positioned adjacent to the second set of tilt latch receptacles;
the first compartment being rotatably connected to the first hinge; and
the second compartment being rotatably connected to the second hinge.

* * * * *